(12) United States Patent
Horinouchi et al.

(10) Patent No.: US 7,058,305 B2
(45) Date of Patent: Jun. 6, 2006

(54) OPTICAL SUBMARINE COMMUNICATION SYSTEM AND SURGE SUPPRESSING APPARATUS OF THE OPTICAL SUBMARINE COMMUNICATION SYSTEM

(75) Inventors: Katsuhiko Horinouchi, Tokyo (JP); Hirotaka Muto, Tokyo (JP); Satoshi Kumayasu, Tokyo (JP); Masaki Nakaoka, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 705 days.

(21) Appl. No.: 10/219,814

(22) Filed: Aug. 16, 2002

(65) Prior Publication Data
US 2003/0151521 A1 Aug. 14, 2003

(30) Foreign Application Priority Data
Feb. 8, 2002 (JP) ............................. 2002-032327

(51) Int. Cl.
*H04B 10/00* (2006.01)
(52) U.S. Cl. .................... 398/105; 398/104; 398/173; 398/175; 398/177; 324/678; 324/519; 379/16; 379/22; 379/24; 379/30; 361/111; 361/119; 340/850; 340/852
(58) Field of Classification Search ........ 385/100–135; 398/104–105, 173, 175, 177; 324/678, 519; 379/16, 22, 24, 30; 361/111, 119; 340/850, 340/852
See application file for complete search history.

(56) References Cited

U.S. PATENT DOCUMENTS

| | | | | | |
|---|---|---|---|---|---|
| 5,446,392 | A | * | 8/1995 | Inoue et al. ................. | 324/678 |
| 5,652,820 | A | * | 7/1997 | Glaser et al. ................ | 385/135 |
| 5,896,482 | A | * | 4/1999 | Blee et al. ................... | 385/107 |

FOREIGN PATENT DOCUMENTS

| | | |
|---|---|---|
| JP | 4-323917 | 11/1992 |
| JP | 5-268123 | 10/1993 |
| JP | 6-104799 | 4/1994 |
| JP | 7-74683 | 3/1995 |

* cited by examiner

*Primary Examiner*—Hanh Phan
(74) *Attorney, Agent, or Firm*—Leydig, Voit & Mayer, Ltd.

(57) ABSTRACT

An optical submarine communication system has a land cable connected to a terminal apparatus which is installed on land near the seashore for transmitting an optical signal and electric power. The land cable is connected to an optical submarine cable through a beach manhole, and a repeater is connected to the optical submarine cable. The optical submarine communication system has a surge suppressor provided on the land cable, whereby a surge generated from the terminal apparatus side because of a lightning stroke or an insulation failure is suppressed and prevented from reaching and damaging the repeater.

18 Claims, 12 Drawing Sheets

OPTICAL SUBMARINE COMMUNICATION SYSTEM AND SURGE SUPPRESSING APPARATUS OF THE OPTICAL SUBMARINE COMMUNICATION SYSTEM

BACKGROUND OF THE INVENTION

1. Field of the Invention

The present invention relates to an optical submarine communication system, and more particularly to an optical submarine communication system comprising a terminal apparatus installed on land for transmitting an optical signal and electric power, a land cable connected to the terminal apparatus, an optical submarine cable connected to the land cable and including an optical fiber and a feeder line for respectively transmitting the optical signal and the electric power from the terminal apparatus, and a repeater connected to the optical submarine cable, driven with the transmitted electric power and amplifying the optical signal, wherein a surge generated from the land cable side because of a lightning stroke or an insulation failure, is suppressed to prevent damaging the repeater.

2. Description of the Related Art

Figure 19:
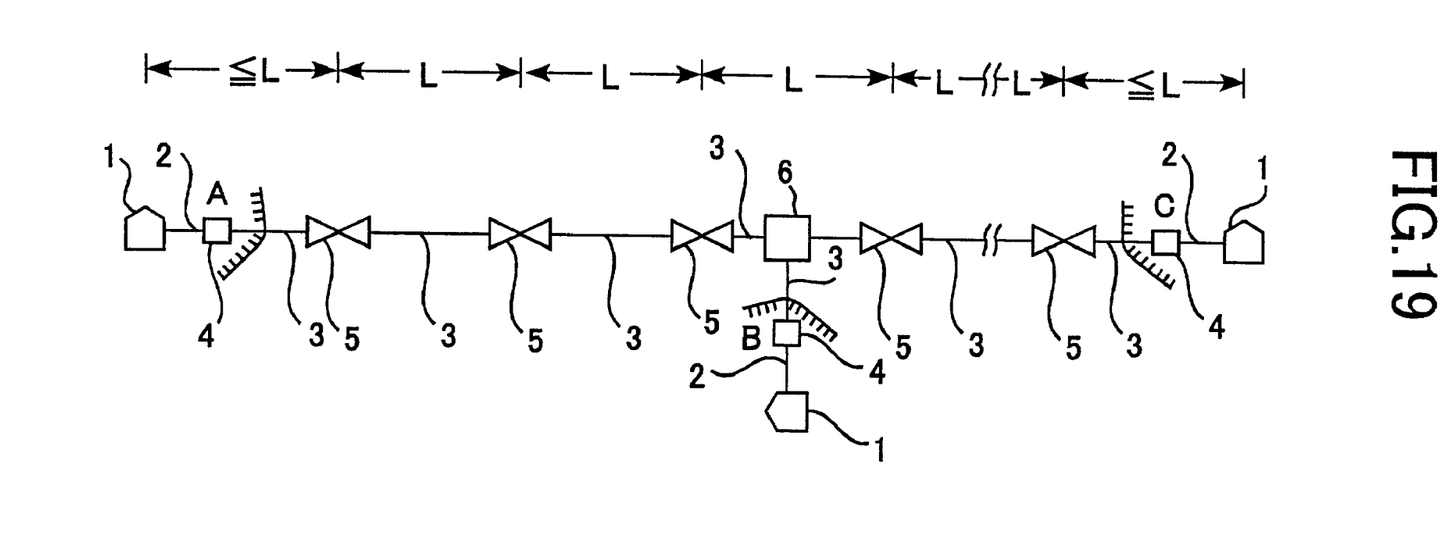
FIG. 19 is an explanatory view showing a schematic arrangement of a conventional optical submarine communication system using an optical submarine cable.
Figure 20:
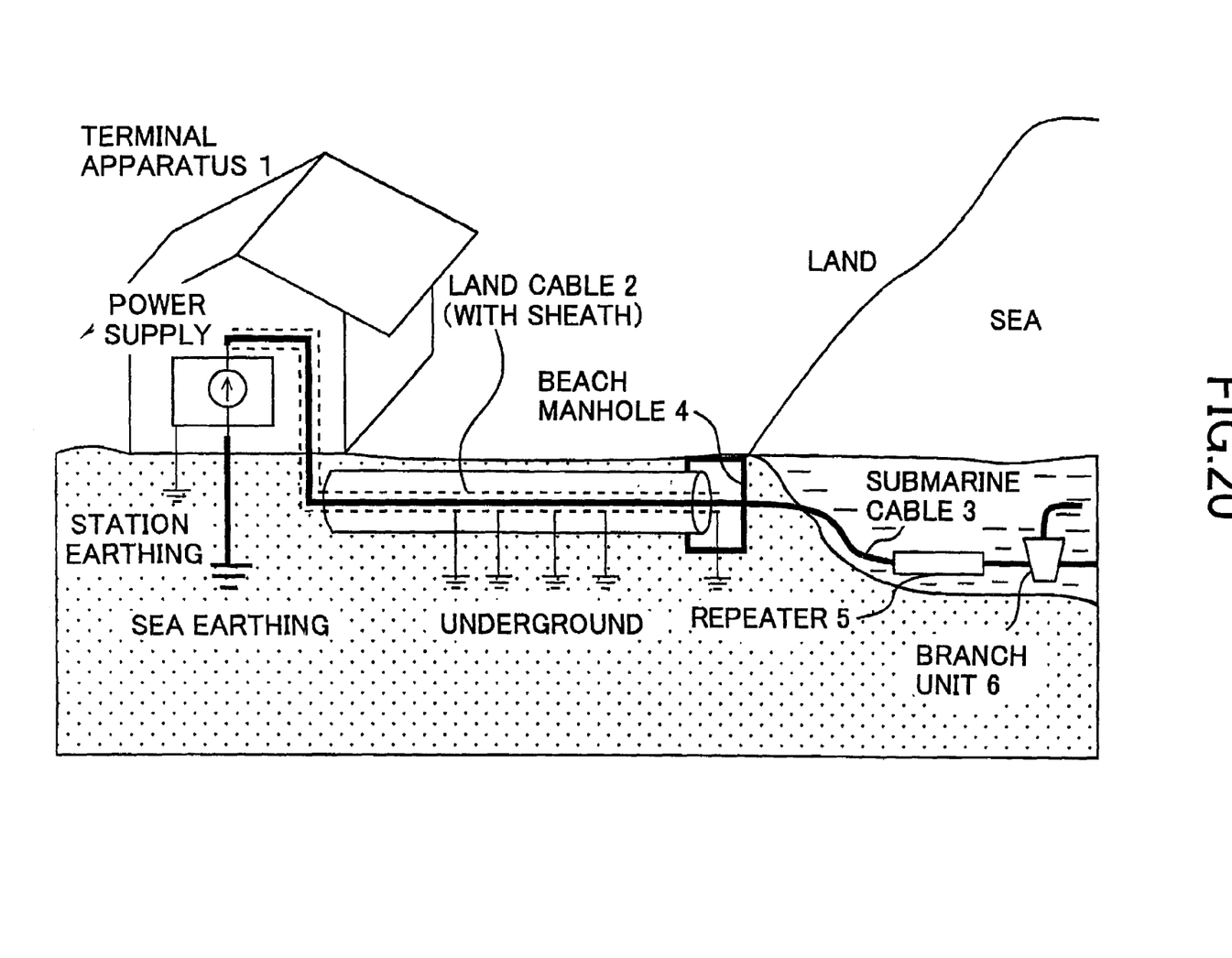
FIG. 20 is an explanatory view showing a manner in which a land terminal station, a land cable and an optical submarine cable are connected in the conventional optical submarine communication system.

FIG. 19 is an explanatory view showing a schematic arrangement of a conventional optical submarine communication system using an optical submarine cable, and FIG. 20 is an explanatory view showing a manner in which a land terminal station, a land cable and an optical submarine cable are connected in the conventional optical submarine communication system. Referring to FIGS. 19 and 20, numeral 1 denotes a terminal (station) apparatus installed near the seashore of each of lands, e.g., lands A, B and C for transmitting an optical signal and electric power, and 2 denotes a land cable connected to the terminal apparatus 1. Numeral 3 denotes an optical submarine cable connected to the land cable 2 through a beach manhole 4 and including an optical fiber and a feeder line for respectively transmitting the optical signal and the electric power from the terminal apparatus 1. Numeral 5 denotes a repeater that is installed on the sea bottom, is connected to the optical submarine cable 3, and amplifies the optical signal. Numeral 6 denotes a branch unit connected to the optical submarine cable 3 and branching the optical signal.

The terminal apparatus 1 is provided with a surge protective device (not shown) and cable grounding to earth at the terminal apparatus 1 itself. Such an arrangement protects internal units of the terminal apparatus 1 against a surge caused when an induction current is generated due to a lightning stroke on a cable and enters the cable. Also, with the above arrangement, a surge generated due to a lightning stroke just on the terminal apparatus 1 or thereabout or with disconnection or an equipment failure occurred in the terminal apparatus 1, is suppressed from entering the land cable 2.

In such a conventional optical submarine communication system, the distance from the seashore to the terminal apparatus 1 is relatively short (about 2 km) and therefore the length of the land cable 2 is also short. As a recent tendency, however, a longer-distance optical submarine communication system is installed and the length of a land cable is increased (over 20 km) as practiced, for example, in the Denmark station of the optical submarine cable system TAT-14 installed by KDDI-SCS. The longer distance of the land cable 2 increases the area in which the land cable 2 may suffer from the adverse effect of a lightning stroke. This results in more frequent surge entering the land cable 2.

Further, when the land cable 2 is relatively short, a surge protective device (not shown) provided in the terminal apparatus 1 and cable grounding to earth at the terminal apparatus 1 itself are also effective in suppressing a surge occurring in the land cable 2. With an increased distance of the land cable 2, however, it is inevitable that some part of the land cable 2 exists outside the range over which a surge is suppressive. This raises a problem in that when a surge caused on the long-distance land cable 2 because of a lightning stroke or disconnection, is going to reach the repeater 5, the surge cannot be suppressed by the surge protective device and the cable grounding at the terminal apparatus 1.

Moreover, it has been thought in the past that grounding the land cable 2 at a portion thereof is effective in suppressing a surge and the object intended by the grounding is sufficiently fulfilled. Such grounding is surely effective in suppressing a surge, but the grounding point also becomes a point through which a surge enters. The reason is that a lightning stroke on the land cable near the grounding point causes a lightning current to flow into the land cable through the grounding point and increases a grounding potential. The increased grounding potential gives rise to a surge voltage in the land cable. Accordingly, this raises a problem in that a satisfactory surge suppressing means cannot be obtained simply by grounding the land cable.

Usually, a surge protective device (not shown) is also provided in the repeater 5. However, since such a surge protective device is provided to prevent a surge from passing a path including the surge protective device and from reaching a main circuit of the repeater 5, it does not have the function of attenuating or suppressing the surge. This has raised a problem that a surge is shut off from one repeater, but is allowed to propagate toward another repeater. Although the surge is eventually attenuated with resistance of the cable, there is a possibility that a high-voltage surge may propagate until it is attenuated.

Thus, a problem has been experienced in that a surge generated in the long-distance land cable 2 because of a lightning stroke or an insulation failure, may propagate to the repeater 5 on the sea bottom through the feeder lines of the land cable 2 and the optical submarine cable 3, and may damage devices inside an amplifier provided in the repeater 5.

SUMMARY OF THE INVENTION

With the view of solving the problem set forth above, it is an object of the present invention to provide an optical submarine communication system in which a surge generated from the land cable side because of a lightning stroke or an insulation failure, can be suppressed from damaging a repeater.

According to the present invention, in an optical submarine communication system comprising a land cable connected to a terminal apparatus, which is installed on land for transmitting an optical signal and electric power, an optical submarine cable including an optical fiber and a feeder line for respectively transmitting the optical signal and the electric power from the terminal apparatus, and a repeater connected to the optical submarine cable, driven with the transmitted electric power and amplifying the optical signal, the system further comprises a surge suppressing unit provided between the terminal apparatus and the repeater and suppressing a surge generated on the terminal apparatus side from reaching the repeater. With such an arrangement, even when a surge is generated in the land cable between the terminal apparatus and the surge suppressing unit because of a lightning stroke or an insulation failure, the surge is attenuated by the surge suppressing unit. As a result, a surge generated in the long-distance land cable because of a lightning stroke or an insulation failure, can be suppressed from propagating to the repeater on the sea bottom through the feeder lines of the land cable and the optical submarine cable, and hence can be avoided from damaging devices inside an amplifier provided in the repeater.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

First Preferred Embodiment

Figure 1:
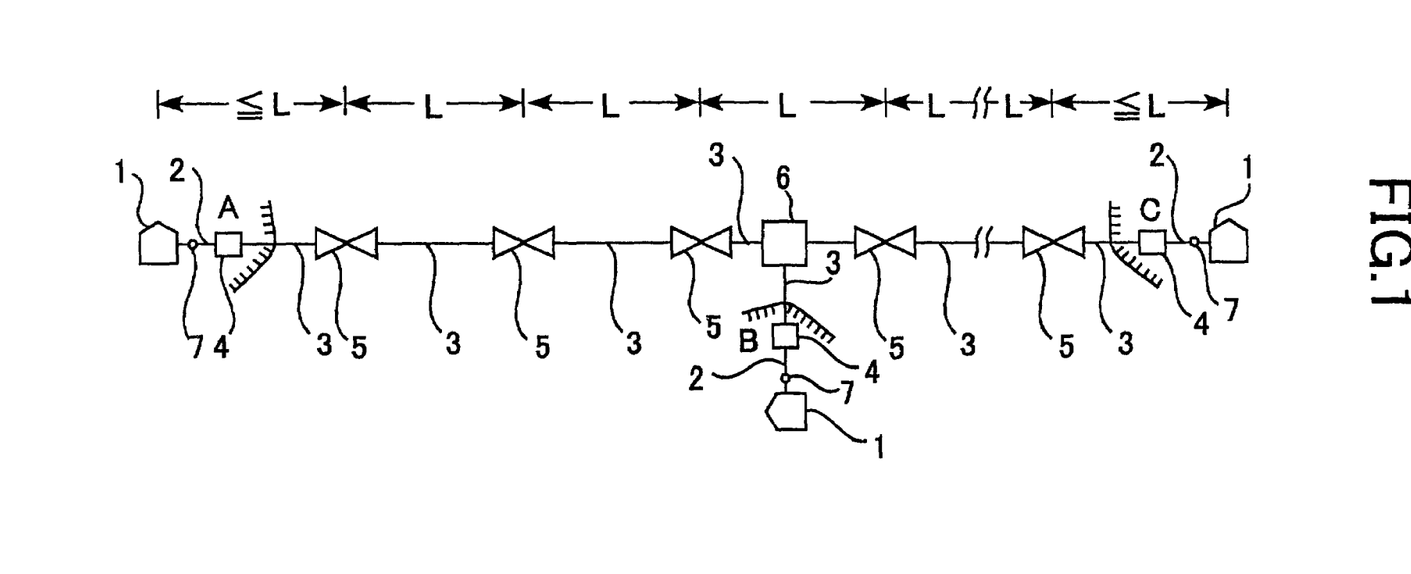
FIG. 1 is an explanatory view showing a schematic arrangement of an optical submarine communication system according to a first preferred embodiment of the present invention.
Figure 2:
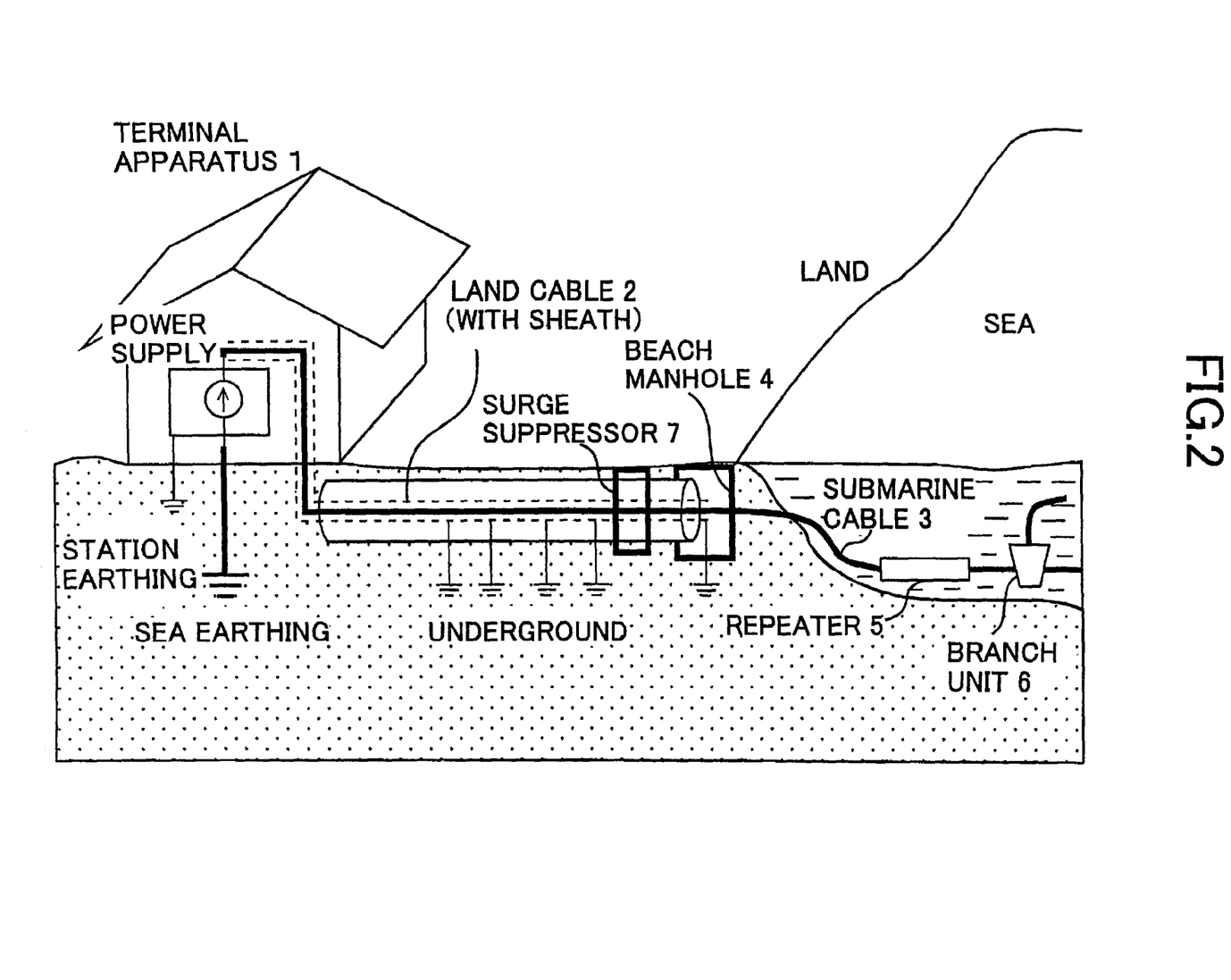
FIG. 2 is an explanatory view showing a manner in which a land terminal station, a land cable and an optical submarine cable are connected in the optical submarine communication system of FIG. 1.

FIG. 1 is an explanatory view showing a schematic arrangement of an optical submarine communication system according to a first preferred embodiment of the present invention, and FIG. 2 is an explanatory view showing a manner in which a land terminal station, a land cable and an optical submarine cable are connected in the optical submarine communication system. Referring to FIGS. 1 and 2, numeral 1 denotes a terminal (station) apparatus installed near the seashore of each of lands, e.g., lands A, B and C for transmitting an optical signal and electric power, and 2 denotes a land cable connected between the terminal apparatus 1 and a beach manhole 4. The land cable 2 is provided with a surge suppressor 7 which will be described later.

Numeral 3 denotes an optical submarine cable connected to the land cable 2 through the beach manhole 4 and including an optical fiber and a feeder line for respectively transmitting the optical signal and the electric power from the terminal apparatus 1. Numeral 5 denotes a repeater that is installed on the sea bottom, is connected to the optical submarine cable 3, and amplifies the optical signal. Numeral 6 denotes a branch unit connected to the optical submarine cable 3 and branching the optical signal. The terminal apparatus 1 is provided with a surge protective device (not shown) and cable grounding to earth at the terminal apparatus 1 itself.

Figure 3:
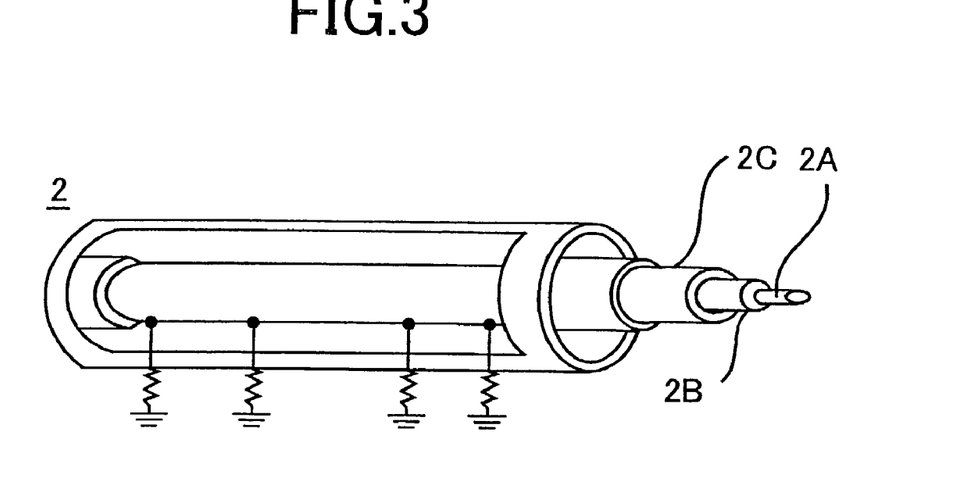
FIG. 3 is a perspective view of the land cable in the optical submarine communication system of FIG. 1.

FIG. 3 is a perspective view of the land cable 2. The land cable 2 comprises a central conductor 2A made up of a plurality of optical fibers, an insulator 2B for insulating the central conductor 2A, and a sheath conductor 2C surrounding the insulator 2B. The optical signal from the terminal apparatus 1 is transmitted through the central conductor 2A, and the electric power is transmitted through a feeder line (not shown) disposed inside the optical fibers.

Figure 4:
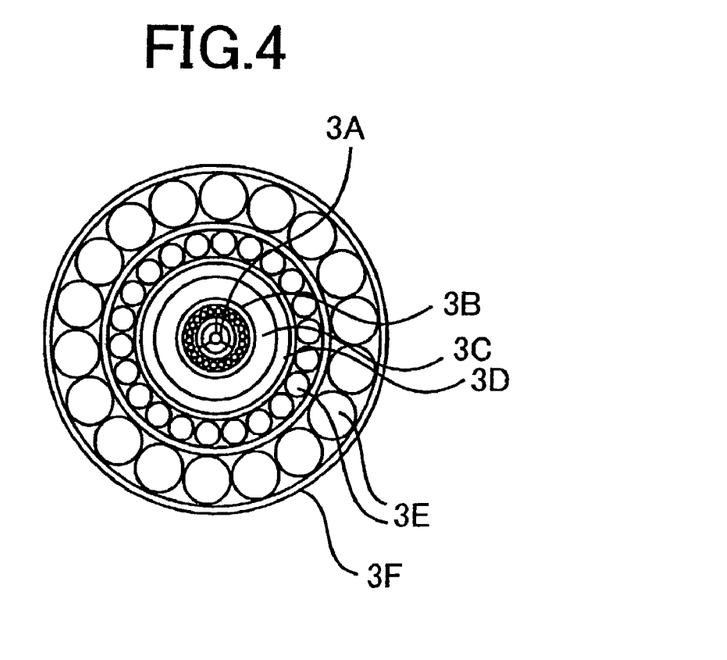
FIG. 4 is a sectional view showing the optical submarine cable in the optical submarine communication system of FIG. 1.

FIG. 4 is a sectional view of the optical submarine cable 3. A central conductor 3A made up of a plurality of optical fibers is covered with a feeder line 3B formed of a steel wire and a copper pipe. A sheath conductor 3D surrounds the feeder line 3B through an insulator 3C. The conductor 3D is covered with an armoring iron wire (referred to as an armor) 3E, and an outer coating 3F surrounds the armor 3E. The optical signal from the terminal apparatus 1 is transmitted through the central conductor (optical fibers) 3A, and the electric power is transmitted through the feeder line 3B.

Figure 5:
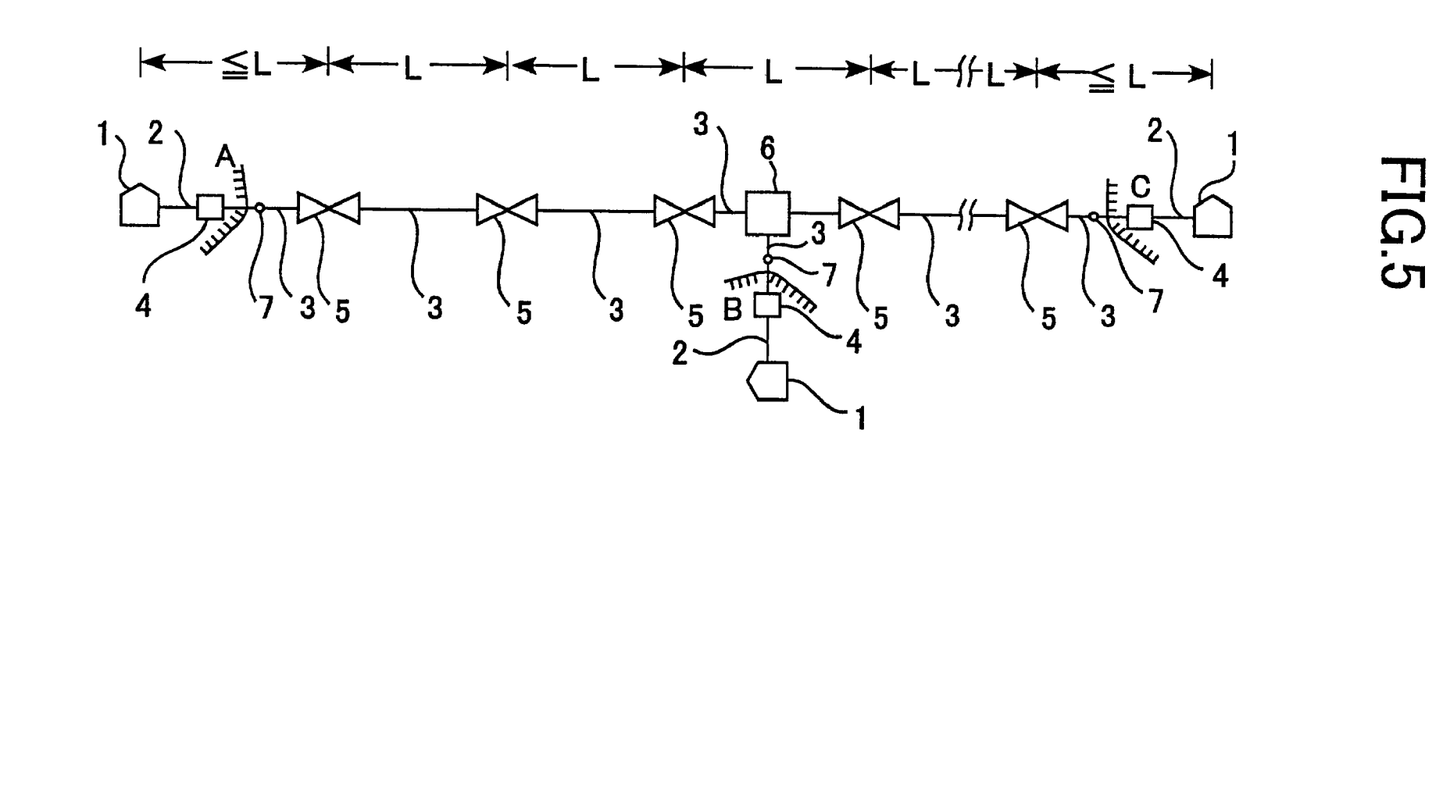
FIG. 5 is an explanatory view showing a schematic arrangement of another optical submarine communication system according to the first preferred embodiment of the present invention.

The surge suppressor 7 is provided between the terminal apparatus 1 and the repeater 5. An installation position of the surge suppressor 7 is optionally selectable. In one case, the surge suppressor 7 is provided in the land cable 2 as shown in FIGS. 1 and 2, whereas in the other case, it is provided in the optical submarine cable 3 as shown in FIG. 5. In either case, even when a surge due to a lightning stroke or an insulation failure, is generated in the land cable 2 between the terminal apparatus 1 and the surge suppressor 7, the generated surge is attenuated by the surge suppressor 7. Therefore, the surge generated in the long-distance land cable 2 because of a lightning stroke or an insulation failure, can be suppressed from propagating to the repeater 5 on the sea bottom through the feeder lines of the land cable 2 and the optical submarine cable 3, and hence can be avoided from damaging devices inside an amplifier provided in the repeater 5.

Further, in the case of providing the surge suppressor 7 in the land cable 2, installation works and inspection/maintenance operations are easier to carry out than in the case of providing the surge suppressor 7 in the optical submarine cable 3. Also, requirements for high reliability of the devices in the surge suppressor 7 provided on the land are not so strict as compared with the cases of the devices in the surge suppressor 7 provided in the sea.

Moreover, providing the surge suppressor 7 in the optical submarine cable 3 is superior to providing the surge suppressor 7 in the land cable 2 in that, while special works are required to obtain satisfactorily small grounding resistance for the surge suppressor 7 when the latter is provided on the land, works for reducing grounding resistance are not required when the surge suppressor 7 is submerged, because in such a case the surge suppressor 7 is surrounded by the seawater.

In addition, since the terminal apparatus 1 is provided with a surge protective device (not shown) and cable grounding to earth at the terminal apparatus 1 itself, internal units of the terminal apparatus 1 are protected against a surge caused when an induction current is generated due to a lightning stroke on a cable and enters the cable. Also, a surge generated due to a lightning stroke just on the terminal apparatus 1 or thereabout or with disconnection or an equipment failure occurred in the terminal apparatus 1 is suppressed from entering the land cable 2.

Second Preferred Embodiment

Figure 6:
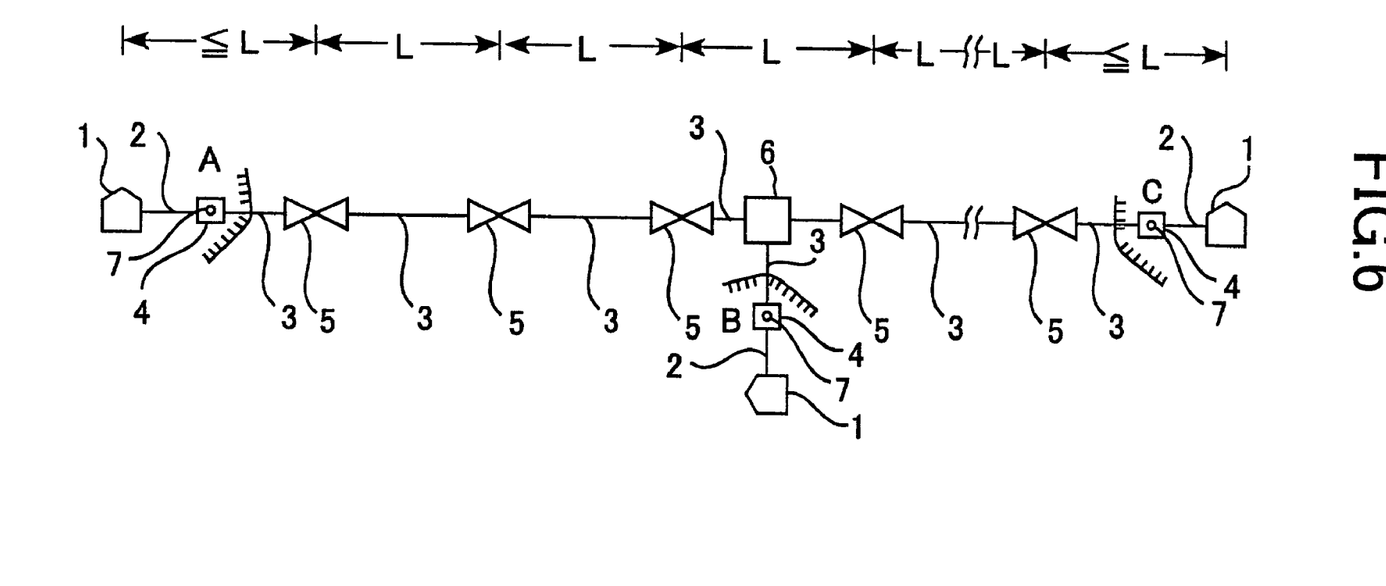
FIG. 6 is an explanatory view showing a schematic arrangement of an optical submarine communication system according to a second preferred embodiment of the present invention.

FIG. 6 is an explanatory view showing a schematic arrangement of an optical submarine communication system according to a second preferred embodiment of the present invention. In FIG. 6, the same symbols as those in FIGS. 1 and 2 denote the same or corresponding components, and a duplicate description of those components is omitted here. This second embodiment differs from the first embodiment in that the surge suppressor is provided in the beach manhole 4 at which the land cable 2 and the optical submarine cable 3 are connected to each other.

By providing the surge suppressor 7 in the beach manhole 4 for connection to both the land cable 2 and the optical submarine cable 3, even when a surge due to a lightning stroke or an insulation failure, is generated in the land cable 2 between the terminal apparatus 1 and the surge suppressor 7, the generated surge is attenuated by the surge suppressor 7. Therefore, the surge generated in the long-distance land cable 2 because of a lightning stroke or an insulation failure, can be suppressed from propagating to the repeater 5 on the sea bottom through the feeder lines of the land cable 2 and the optical submarine cable 3, and hence can be avoided from damaging devices inside an amplifier provided in the repeater 5.

Also, with the arrangement that the surge suppressor 7 is connected to both the land cable 2 and the optical submarine cable 3 at the beach manhole 4 that serves as a junction between both the cables, the surge suppressor 7 can be installed without requiring the land cable 2 and the optical submarine cable 3 to be cut at intermediate portions thereof. Accordingly, the surge suppressor 7 can easily be installed when, for example, it is applied to an existing optical submarine communication system.

Furthermore, when grounding the surge suppressor 7 at the beach manhole 4, the ground around the beach manhole 4 contains a certain amount of seawater because the beach manhole 4 is provided on the seashore. Thus, the ground has relatively low resistance and hence satisfactory grounding resistance can be obtained with simple grounding works.

Incidentally, when the surge suppressor 7 is inserted in the land cable 2, a risk remains that a surge due to a lightning stroke may enter the land cable in its part extending from the installation position of the surge suppressor 7 to the seashore. For a cable portion extended from the beach manhole 4, however, since the beach manhole 4 is provided near the sea, a possibility that the surge may enter the cable is low.

Third Preferred Embodiment

A surge suppressor according to a third preferred embodiment of the present invention will be described below. To enable locating of a cut point in the event of an accidental cutting of a cable, the distance from a measuring point to the cut point is determined by sending a count signal with frequency of not more than 50 Hz and measuring the time required for the count signal to go to and return from the cut point after reflection. The surge suppressor of this embodiment is constructed not to attenuate any signal of not more than 50 Hz so that the count signal is allowed to pass the surge suppressor. The surge suppressor includes a filter for attenuating components with frequencies of not less than 50 Hz, while allowing components with frequencies higher than 50 Hz to pass the filter. By employing a cable system, in which at least a feed current has basic frequency of not more than 50 Hz, in an optical submarine communication system provided with the surge suppressor of this embodiment, a control signal, etc. can be transmitted through a feeder line.

Fourth Preferred Embodiment

A surge suppressor according to a fourth preferred embodiment of the present invention will be described below. When a surge wave is generated between the terminal apparatus 1 and the surge suppressor 7 that is constituted by a low-pass filter using, e.g., a reactor as described later, the generated surge wave propagates in opposite directions toward the terminal apparatus 1 and the surge suppressor 7 and is then reflected by the terminal apparatus 1 and the surge suppressor 7. The surge wave is attenuated while it is propagating through the land cable 2.

When the distance between the terminal apparatus 1 and the surge suppressor 7 is relatively short, an amount by which the surge wave is attenuated is so small that the surge wave reciprocally propagates with repeated reflections, thus resulting in a standing state. Of frequency components of the surge wave, in particular, a component resonating with the line length becomes a standing wave. Further, the standing waves created by surges propagating in the opposite directions intensify each other in some cases. Depending on the magnitude of those standing waves, a surge wave having a relatively low frequency component, which still has large energy even after being suppressed by the surge suppressor 7, may propagate to the repeater 5.

Assuming that the attenuation constant of the land cable 2 is $\alpha$, the surge suppressor 7 according to the fourth preferred embodiment of the present invention is provided in a position at which a length L of the land cable 2 between the terminal apparatus 1 and the surge suppressor 7 exceeds $1/\alpha$. Therefore, even when a surge wave is generated between the terminal apparatus 1 and the surge suppressor 7, the generated surge wave is attenuated to 1/e (e is the base of a natural logarithm) while it is propagating. As a result, the magnitude of the standing waves generated by reciprocal propagations with repeated reflections can be reduced to suppress an adverse effect against the repeater 5 on the sea bottom. In addition, an adverse effect on both the terminal apparatus 1 and the surge suppressor 7 caused by the standing waves can also be suppressed.

Fifth Preferred Embodiment

Figure 7:
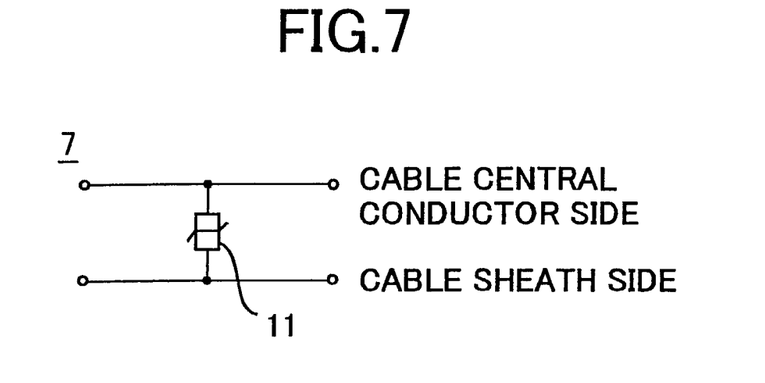
FIG. 7 is an explanatory view showing a surge suppressor according to a fifth preferred embodiment of the present invention.

FIG. 7 is an explanatory view showing a surge suppressor according to a fifth preferred embodiment of the present invention. Referring to FIG. 7, marks O represent junctions of the surge suppressor 7, which is provided between the terminal apparatus 1 and the repeater 5, with a cable central conductor of the land cable 2 or the optical submarine cable 3, and junctions of the surge suppressor 7 with a cable sheath of either cable. Numeral 11 denotes an arrester in the form of a nonlinear resistance device that is provided as the surge suppressor 7 and is connected between the central conductor side and the cable sheath side of the land cable 2 or the optical submarine cable 3.

With such an arrangement, a surge generated in the long-distance land cable 2 because of a lightning stroke or an insulation failure, can be suppressed from propagating to the repeater 5 on the sea bottom through the feeder lines of the land cable 2 and the optical submarine cable 3, and hence can be avoided from damaging devices inside an amplifier provided in the repeater 5. In particular, a surge wave generating a high voltage can be suppressed.

Figure 8:
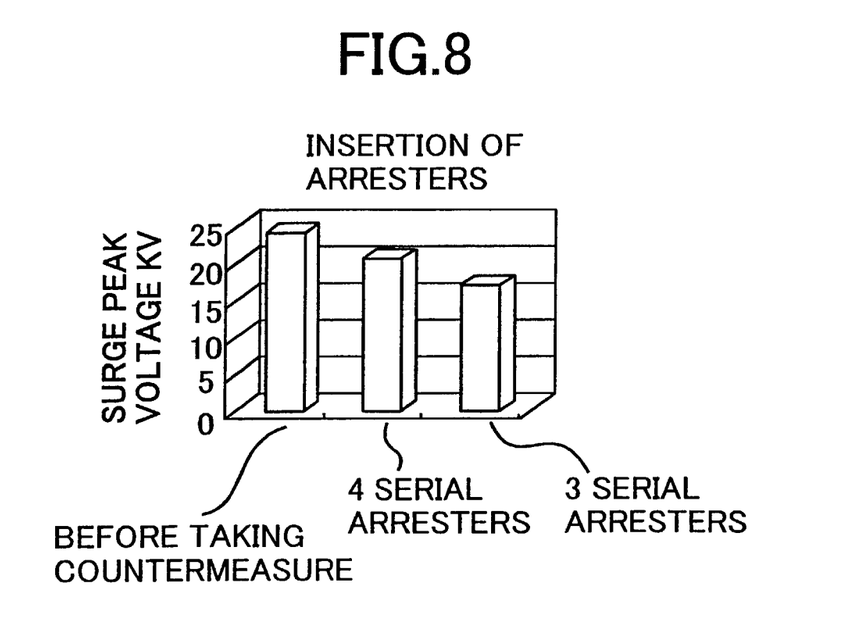
FIG. 8 is a graph showing results obtained by calculating how a peak of a surge voltage applied to a repeater is suppressed when zinc oxide arresters, MDH-PA by Mitsubishi, for a DC 1500V circuit are provided in the surge suppressor installed in a beach manhole as the embodiment of FIG. 7.

FIG. 8 is a graph showing, by way of example, results obtained by calculating how a peak of a surge voltage applied to the repeater 5 is suppressed when arresters each constituted by a nonlinear resistance device such as a zinc oxide device, e.g., a zinc oxide arrester, MDH-PA by Mitsubishi, for a DC 1500V circuit, are provided in the surge suppressor 7 installed in the beach manhole 4. In FIG. 8, "3 SERIAL ARRESTERS" represents the case in which three arresters are connected in series, and "4 SERIAL ARRESTERS" represents the case in which four arresters are connected in series. As seen from FIG. 8, the surge peak voltage can be attenuated about 10 kV after taking a countermeasure (i.e., provision of the arresters as the surge suppressor 7) in comparison with before taking a countermeasure (i.e., without providing the arresters as the surge suppressor 7).

Sixth Preferred Embodiment

Figure 9:
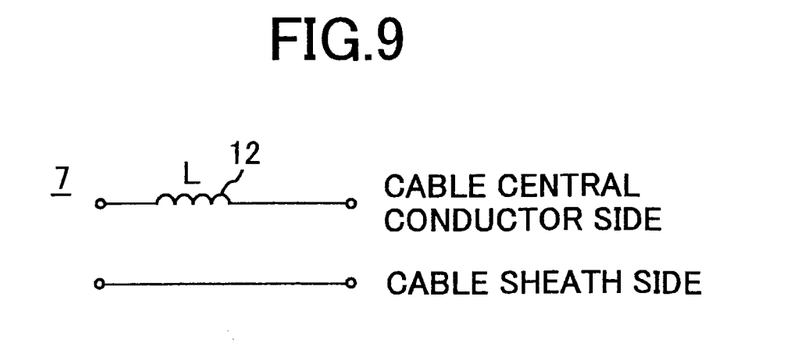
FIG. 9 is an explanatory view showing a surge suppressor according to a sixth preferred embodiment of the present invention.

FIG. 9 is an explanatory view showing a surge suppressor according to a sixth preferred embodiment of the present invention. In FIG. 9, the same symbols in FIG. 7 denote the same components, and a duplicate description thereof is omitted here. Numeral 12 denotes a reactor that is provided as the surge suppressor 7 and is connected to the central conductor side of the land cable 2 or the optical submarine cable 3. With such an arrangement, a surge generated in the long-distance land cable 2 because of a lightning stroke or an insulation failure, can be suppressed from propagating to the repeater 5 on the sea bottom through the feeder lines of the land cable 2 and the optical submarine cable 3, and hence can be avoided from damaging devices inside an amplifier provided in the repeater 5. In particular, high frequency components of a surge wave can be suppressed from propagating to the side of the repeater 5.

Figure 10:
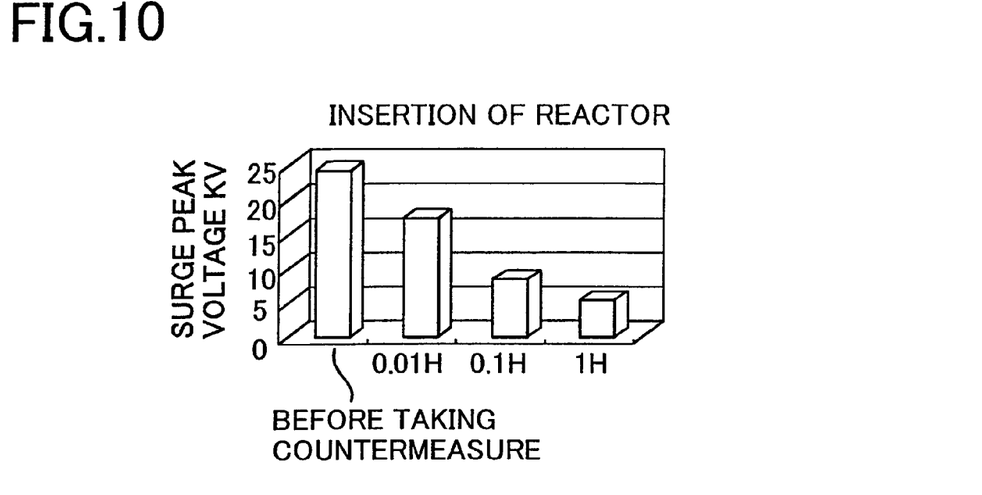
FIG. 10 is a graph showing results obtained by calculating how a peak of a surge voltage applied to a repeater is suppressed when a reactor is provided in the surge suppressor installed in a beach manhole as the embodiment of FIG. 9.

FIG. 10 is a graph showing, by way of example, results obtained by calculating how a peak of a surge voltage applied to the repeater 5 is suppressed when the reactor 12 is provided in the surge suppressor 7 installed in the beach manhole 4. The surge peak voltage can be attenuated about 20 kV at maximum after taking a countermeasure (i.e., provision of the reactor 12 as the surge suppressor 7) in comparison with before taking a countermeasure (i.e., without providing the reactor 12 as the surge suppressor 7).

Seventh Preferred Embodiment

Figure 11A:
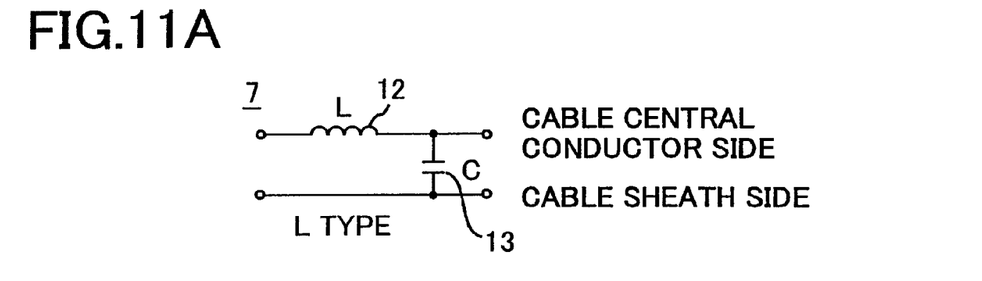
FIGS. 11A to 11C are each an explanatory view showing a surge suppressor according to a seventh preferred embodiment of the present invention.
Figure 11B:
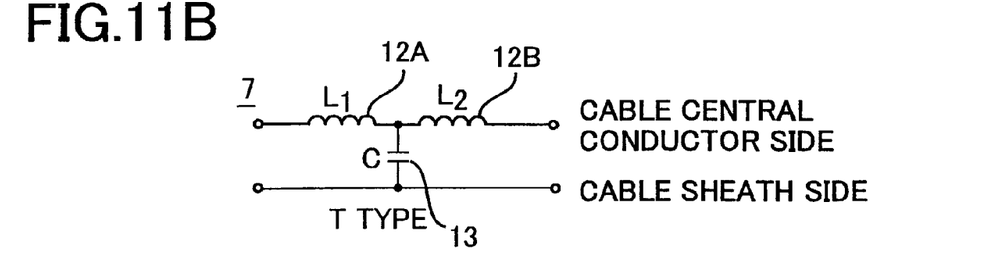
Figure 11C:
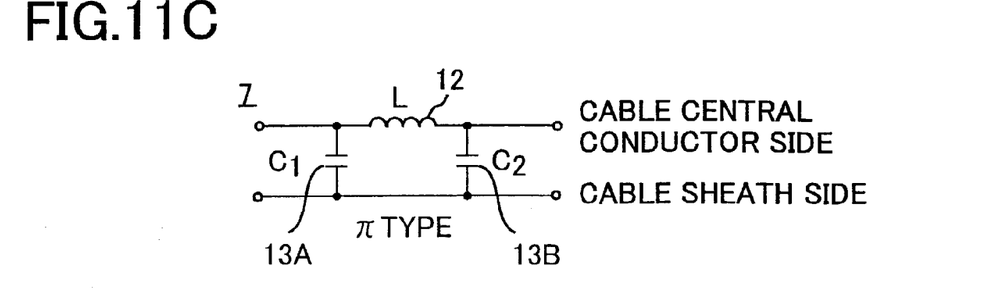

FIGS. 11A, 11B and 11C are each an explanatory view showing a surge suppressor according to a seventh preferred embodiment of the present invention. Referring to FIGS. 11A, 11B and 11C, numerals 12, 12A and 12B denote reactors connected to the central conductor side of the land cable 2 or the optical submarine cable 3, and numerals 13, 13A and 13B denote capacitors connected between the central conductor side and the cable sheath side of the land cable 2 or the optical submarine cable 3. One or two of the reactors and one or two of the capacitors are provided as the surge suppressor 7 in a proper combination to constitute an L-, T- or $\pi$-type filter.

With the provision of the filter having such an arrangement, a surge generated in the long-distance land cable 2 because of a lightning stroke or an insulation failure, can be suppressed from propagating to the repeater 5 on the sea bottom through the feeder lines of the land cable 2 and the optical submarine cable 3, and hence can be avoided from damaging devices inside an amplifier provided in the repeater 5. In particular, high frequency components of a surge wave can be suppressed from propagating to the side of the repeater 5.

Eighth Preferred Embodiment

Figure 12:
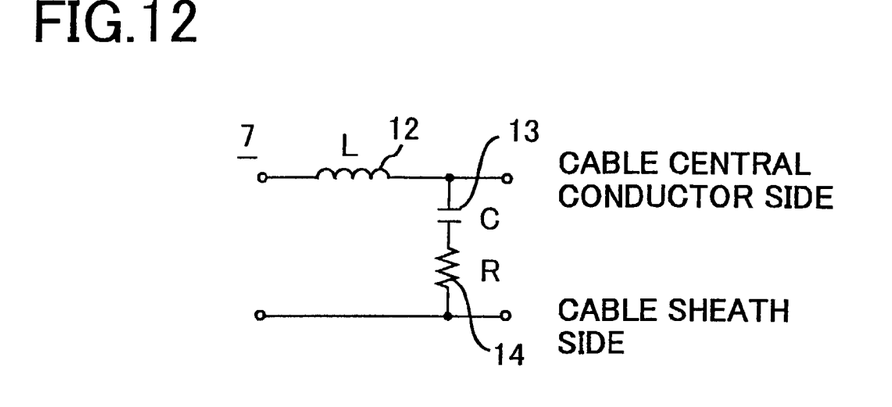
FIG. 12 is an explanatory view showing a surge suppressor according to an eighth preferred embodiment of the present invention.

FIG. 12 is an explanatory view showing a surge suppressor according to an eighth preferred embodiment of the present invention. Referring to FIG. 12, a reactor 12 connected to the central conductor side of the land cable 2 or the optical submarine cable 3, a capacitor 13 connected between the central conductor side and the cable sheath side of the land cable 2 or the optical submarine cable 3 to which the reactor 12 is connected, and an attenuating resistance 14 connected in series to the capacitor 13 are combined with each other to constitute a filter as the surge suppressor 7.

With the provision of the filter having such an arrangement, a surge generated in the long-distance land cable 2 because of a lightning stroke or an insulation failure, can be suppressed from propagating to the repeater 5 on the sea bottom through the feeder lines of the land cable 2 and the optical submarine cable 3, and hence can be avoided from damaging devices inside an amplifier provided in the repeater 5. In particular, a standing wave generated between the surge suppressor 7 and the terminal apparatus 1 from a wave reflected by the surge suppressor 7 can be attenuated.

Additionally, the attenuating resistance 14 may be connected in series to each of the capacitors 13, 13A and 13B shown in FIGS. 11A, 11B and 11C. This arrangement can also provide similar advantages in operation as those described above.

Ninth Preferred Embodiment

Figure 13:
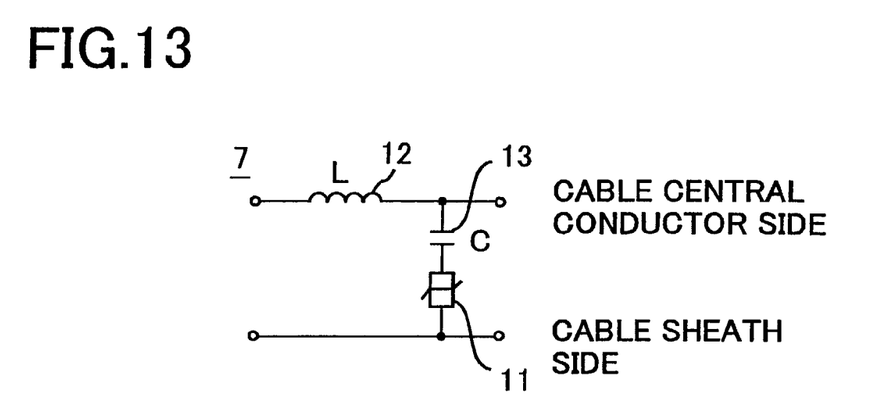
FIG. 13 is an explanatory view showing a surge suppressor according to a ninth preferred embodiment of the present invention.

FIG. 13 is an explanatory view showing a surge suppressor according to a ninth preferred embodiment of the present invention. In FIG. 13, the same symbols in FIG. 12 denote the same or corresponding components, and a duplicate description thereof is omitted here. Numeral 11 denotes an arrester in the form of a nonlinear device connected in series to the capacitor 13. The arrester 11, the reactor 12 and the capacitor 13 are combined with each other to constitute a filter as the surge suppressor 7.

With the provision of the filter having such an arrangement, a surge generated in the long-distance land cable 2 because of a lightning stroke or an insulation failure, can be suppressed from propagating to the repeater 5 on the sea bottom through the feeder lines of the land cable 2 and the optical submarine cable 3, and hence can be avoided from damaging devices inside an amplifier provided in the repeater 5. In particular, a standing wave generated between the surge suppressor 7 and the terminal apparatus 1 from a wave reflected by the surge suppressor 7 can be attenuated. Further, a surge wave generating a high voltage can be suppressed.

Additionally, the arrester 11 may be connected in series to each of the capacitors 13, 13A and 13B shown in FIGS. 11B and 11C. This arrangement can also provide similar advantages in operation as those described above.

Tenth Preferred Embodiment

Figure 14:
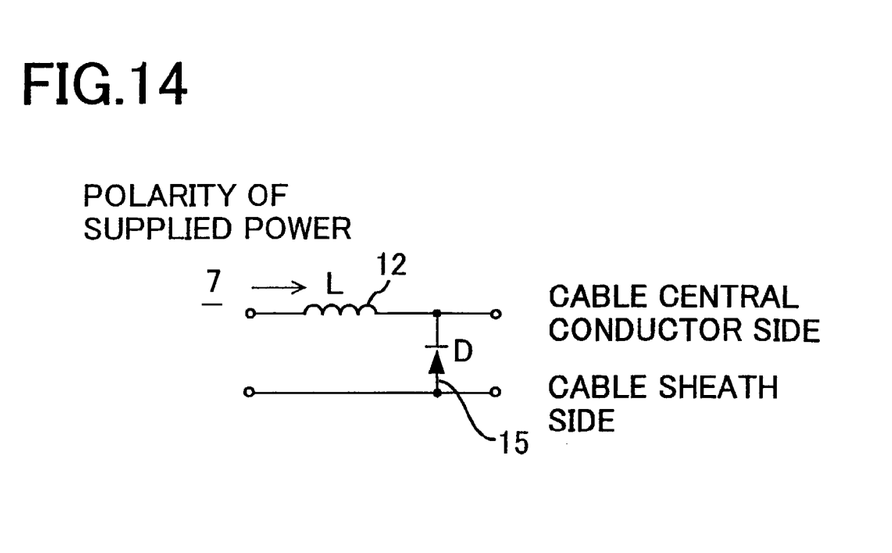
FIG. 14 is an explanatory view showing a surge suppressor according to a tenth preferred embodiment of the present invention.

FIG. 14 is an explanatory view showing a surge suppressor according to a tenth preferred embodiment of the present invention. Referring to FIG. 14, numeral 15 denotes a diode connected between the central conductor side and the cable sheath side of the land cable 2 or the optical submarine cable 3 to which the reactor 12 is connected. The diode 15 is combined with the reactor 12 to constitute a filter as the surge suppressor 7. The diode 15 is connected such that when voltage polarity is opposed to the polarity of supplied power, a potential differential is eliminated, i.e., the diode 15 functions to increase an amount of attenuation or reduce an amount of transmittance of a surge having polarity opposed to the polarity of supplied power.

With the provision of the filter having such an arrangement, a surge generated in the long-distance land cable 2 because of a lightning stroke or an insulation failure, can be suppressed from propagating to the repeater 5 on the sea bottom through the feeder lines of the land cable 2 and the optical submarine cable 3, and hence can be avoided from damaging devices inside an amplifier provided in the repeater 5. In particular, it is possible to employ the repeater 5 that has high durability against only a surge having forward polarity.

Eleventh Preferred Embodiment

Figure 15A:
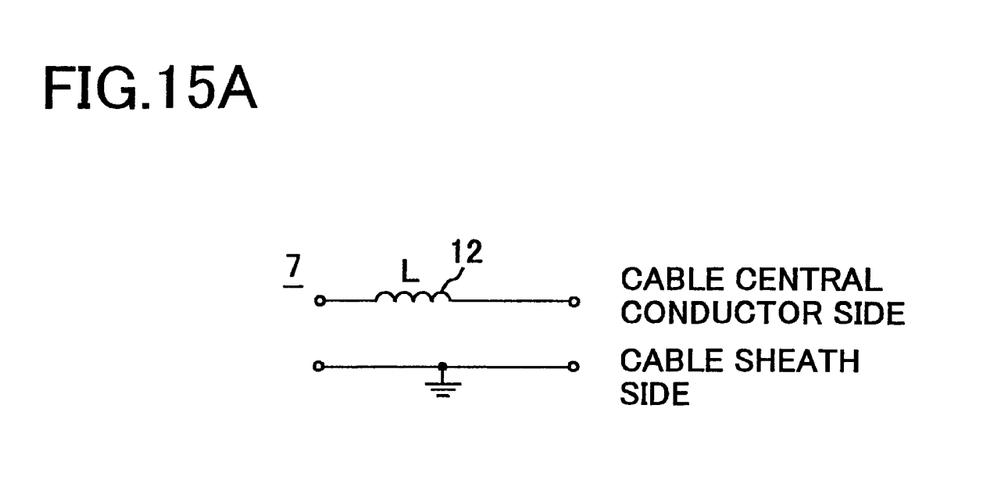
FIGS. 15A and 15B are each an explanatory view showing a surge suppressor according to an eleventh preferred embodiment of the present invention.
Figure 15B:
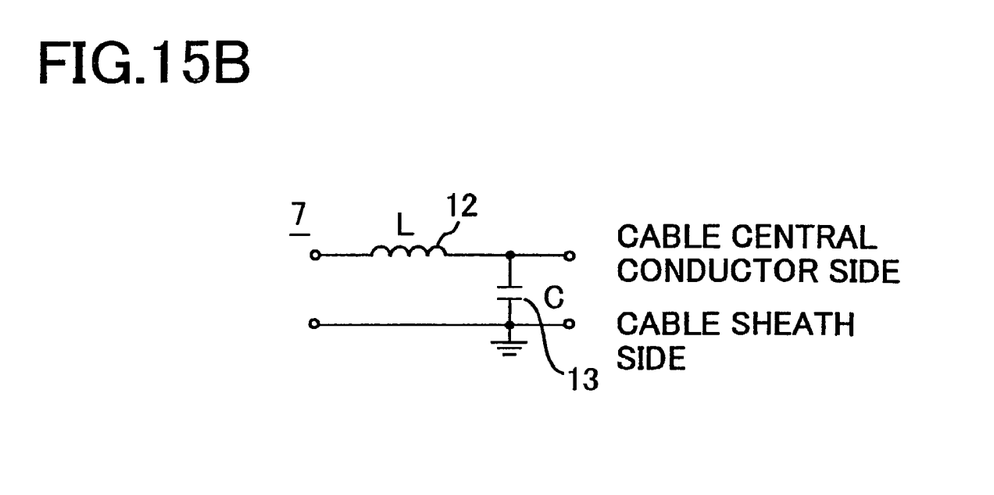

FIGS. 15A and 15B are each an explanatory view showing a surge suppressor according to an eleventh preferred embodiment of the present invention. In FIGS. 15A and 15B, the same symbols in FIGS. 9 and 11 denote the same or corresponding components, and a duplicate description thereof is omitted here. The cable sheath side of the surge suppressor 7 is grounded to reduce a surge entering the cable through the surge suppressor 7 itself. Further, as with the embodiments shown in FIGS. 9 and 11, it is possible to suppress a surge and to prevent the surge from adversely affecting the repeater 5.

Twelfth Preferred Embodiment

Figure 16:
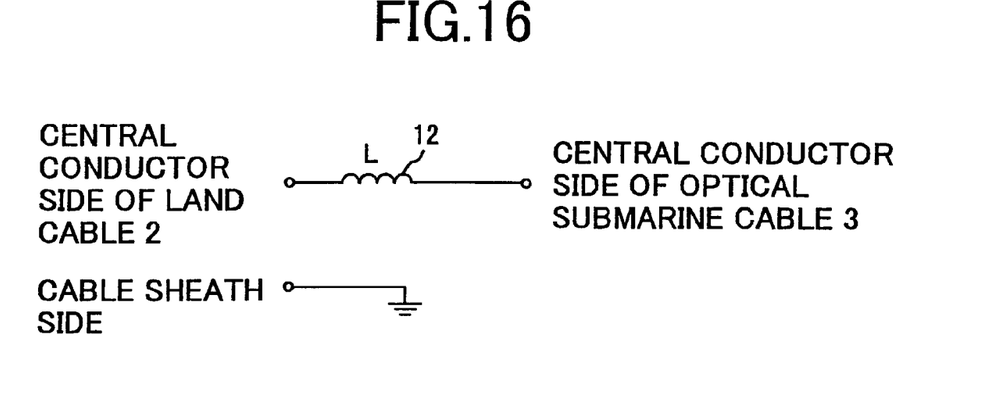
FIG. 16 is an explanatory view showing a surge suppressor according to a twelfth preferred embodiment of the present invention.

FIG. 16 is an explanatory view showing a surge suppressor according to a twelfth preferred embodiment of the present invention. Referring to FIG. 16, numeral 12 denotes a reactor provided on the central conductor side of the cable. The cable sheath 2c of the land cable 2 is connected to the grounding electrode side of the surge suppressor 7. As a result, a surge entering the cable through the surge suppressor 7 itself can be suppressed. Further, as with the embodiment shown in FIG. 15A, it is possible to suppress a surge and to prevent the surge from adversely affecting the repeater 5.

Thirteenth Preferred Embodiment

Figure 17:
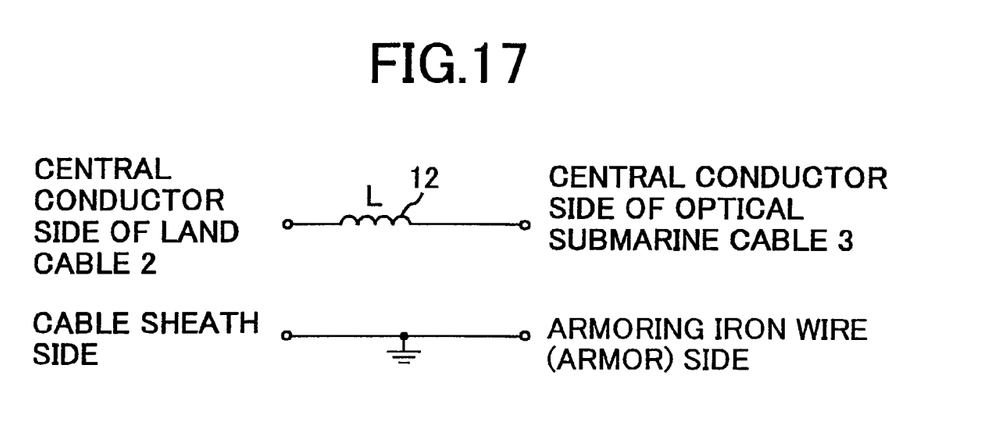
FIG. 17 is an explanatory view showing a surge suppressor according to a thirteenth preferred embodiment of the present invention.

FIG. 17 is an explanatory view showing a surge suppressor according to a thirteenth preferred embodiment of the present invention. Referring to FIG. 17, numeral 12 denotes a reactor provided on the central conductor side of the cable. The cable sheath 2C of the land cable 2 and the armoring iron wire (armor) 3E of the optical submarine cable 3 are both connected to the grounding electrode side of the surge suppressor 7. As a result, a surge entering the cable through the surge suppressor 7 itself can be suppressed. Further, as with the embodiment shown in FIG. 15A, it is possible to suppress a surge and to prevent the surge from adversely affecting the repeater 5.

Fourthteenth Preferred Embodiment

Figure 18:
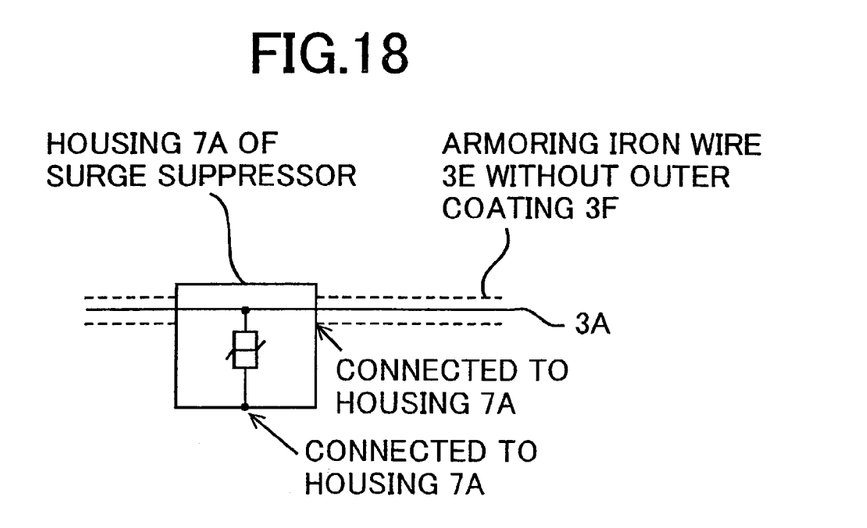
FIG. 18 is an explanatory view showing a surge suppressor according to a fourteenth preferred embodiment of the present invention.

FIG. 18 is an explanatory view showing a surge suppressor according to a fourteenth preferred embodiment of the present invention. Referring to FIG. 18, numeral 7A denotes a housing of the surge suppressor 7. The armoring iron wire (armor) 3E is connected to the housing 7A of the surge suppressor 7 in a condition in which the outer coating 3F of the optical submarine cable 3 is removed and the armoring iron wire (armor) 3E is in contact with the seawater. Since the armoring iron wire (armor) 3E exposed by removing the outer coating 3F of the optical submarine cable 3 serves as an earthing member, the surge suppressor 7 can be earthed with no need of establishing connection of the surge suppressor itself to the ground.

Incidentally, the surge suppressor 7 can be installed at the beach manhole 4 or in the sea.

With such an arrangement, a surge entering the cable through the surge suppressor 7 itself can be suppressed. Further, as with the embodiment shown in FIG. 17, it is possible to suppress a surge and to prevent the surge from adversely affecting the repeater 5.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An optical submarine communication system comprising:
   a land cable connected to a terminal apparatus which is installed on land for transmitting an optical signal and electrical power;
   an optical submarine cable including an optical fiber and a feeder line which respectively transmit the optical signal and the electrical power from the terminal apparatus;
   a repeater connected to said optical submarine cable, driven with the electrical power and amplifying the optical signal; and
   a surge suppressing unit provided between the terminal apparatus and said repeater, suppressing a surge propagating toward said repeater, from reaching said repeater, wherein, assuming that said land cable has an attenuation constant $\alpha$, said surge suppressing unit is located at a position at which a length of said land cable between said terminal apparatus and said surge suppressing unit exceeds $1/\alpha$.

2. An optical submarine communication system comprising:
   a land cable including a sheath and a central conductor, the land cable being connected to a terminal apparatus which is installed on land for transmitting an optical signal and electrical power;
   an optical submarine cable including a sheath, a central conductor, an optical fiber, and a feeder line, the optical fiber and the feeder line respectively transmitting the optical signal and the electrical power from the terminal apparatus;
   a repeater connected to said optical submarine cable, driven with the electrical power and amplifying the optical signal; and
   a surge suppressing unit located between the terminal apparatus and said repeater, suppressing a surge propagating toward said repeater, from reaching said repeater, said surge suppressing unit including a filter in combination with a reactor, connected to the central conductor of one of said land cable and said optical submarine cable, and a capacitor connected between the central conductor, to which said reactor is connected, wherein the sheath of one of said land cable and said optical submarine cable, and an attenuating resistance are connected in series with said capacitor.

3. The optical submarine communication system according to claim 2, wherein said surge suppressing unit is located on said land cable.

4. The optical submarine communication system according to claim 2, wherein said surge suppressing unit is located in said optical submarine cable.

5. The optical submarine communication system according to claim 2, wherein said surge suppressing unit is located in a junction between said land cable and said optical submarine cable.

6. The optical submarine communication system according to claim 2, wherein said filter attenuates frequency components higher than 50 Hz and passes frequency components not exceeding 50 Hz.

7. The optical submarine communication system according to claim 2, wherein said attenuating resistance is a nonlinear resistance device.

8. The optical submarine communication system according to claim 2, wherein said surge suppressing unit is grounded to the earth at the cable sheath.

9. The optical submarine communication system according to claim 2, wherein said optical submarine cable includes an armoring iron wire connected to a housing of said surge suppressing unit, said armoring iron wire being in contact with seawater.

10. An optical submarine communication system comprising:
    a land cable including a sheath and a central conductor, the land cable being connected to a terminal apparatus which is installed on land for transmitting an optical signal and electrical power;
    an optical submarine cable including a sheath, a central conductor, an optical fiber, and a feeder line, the optical fiber and the feeder line respectively transmitting the optical signal and the electrical power from the terminal apparatus;
    a repeater connected to said optical submarine cable, driven with the electrical power and amplifying the optical signal; and
    a surge suppressing unit located between the terminal apparatus and said repeater, suppressing a surge propagating toward said repeater, from reaching said repeater, said surge suppressing unit including a filter in combination with a reactor, connected to the central conductor of one of said land cable and said optical submarine cable, and a surge suppressing device diode connected between the central conductor, to which said reactor is connected, and the sheath of one of said land cable and said optical submarine cable, said surge suppressing device diode having a high attenuating characteristic or a low passing characteristic for a surge, and a polarity opposed to polarity of the electrical power supplied.

11. The optical submarine communication system according to claim 10, wherein said surge suppressing unit is grounded to the earth at the cable sheath.

12. The optical submarine communication system according to claim 10, wherein said surge suppressing unit is located in said land cable.

13. The optical submarine communication system according to claim 10, wherein said surge suppressing unit is located in said optical submarine cable.

14. The optical submarine communication system according to claim 10, wherein said surge suppressing unit is located at a junction between said land cable and said optical submarine cable.

15. The optical submarine communication system according to claim 10, wherein said filter attenuates frequency components higher than 50 Hz and passes frequency components not exceeding 50 Hz.

16. The optical submarine communication system according to claim 10, wherein said optical submarine cable includes an armoring iron wire connected to a housing of said surge suppressing unit, said armoring iron wire being in contact with seawater.

17. A surge suppressing apparatus for an optical submarine communication system that includes a land cable including a sheath and a central conductor, the land cable being connected to a terminal apparatus which is installed on land for transmitting an optical signal and electrical power, an optical submarine cable including a sheath, a central conductor, an optical fiber for transmitting the optical signal, and a feeder line for transmitting the electrical power from the terminal apparatus, and a repeater connected to said optical submarine cable, driven with the electrical power and amplifying the optical signal, said surge suppressing apparatus comprising:

a reactor connected to the central conductor of one of said land cable and said optical submarine cable;

a capacitor connected between the central conductor, to which said reactor is connected, and the sheath of one of said land cable and said optical submarine cable; and an attenuating resistance connected in series with said capacitor.

18. A surge suppressing apparatus for an optical submarine communication system that includes a land cable including a sheath and a central conductor, the land cable being connected to a terminal apparatus which is installed on land for transmitting an optical signal and electrical power, an optical submarine cable including a sheath, a central conductor, an optical fiber for transmitting the optical signal, and a feeder line for transmitting the electrical power from the terminal apparatus, and a repeater connected to said optical submarine cable, driven with the electrical power and amplifying the optical signal, said surge suppressing apparatus comprising:

a reactor connected to the central conductor of one of said land cable and said optical submarine cable; and a surge suppressing device diode connected between the central conductor, to which said reactor is connected, and the sheath of one of said land cable and said optical submarine cable, said surge suppressing device diode having a high attenuating characteristic or a low passing characteristic for a surge, and a polarity opposed to polarity of the electrical power supplied.

* * * * *